United States Patent [19]

Alwadish

[11] Patent Number: 5,063,610

[45] Date of Patent: Nov. 5, 1991

[54] BROADCASTING SYSTEM WITH SUPPLEMENTAL DATA TRANSMISSION AND STORAGE

[75] Inventor: David Alwadish, New York, N.Y.

[73] Assignee: Ing Communications, Inc., New York, N.Y.

[21] Appl. No.: 663,298

[22] Filed: Feb. 28, 1991

Related U.S. Application Data

[63] Continuation of Ser. No. 413,536, Sep. 27, 1989, abandoned.

[51] Int. Cl.$^5$ .......... H04B 7/00

[52] U.S. Cl. .......... 455/45; 455/66; 455/158; 455/186

[58] Field of Search .......... 455/3, 6, 42, 45, 66, 455/68, 70, 158, 185, 186; 381/1, 2, 3, 4, 5, 6, 77, 78, 81, 119

[56] References Cited

U.S. PATENT DOCUMENTS

| | | | |
|---|---|---|---|
| 4,268,724 | 5/1981 | Hubbard . | |
| 4,279,035 | 7/1981 | Skerlos | 455/158 |
| 4,379,947 | 4/1983 | Warner | 370/11 |
| 4,380,027 | 4/1983 | Leventer et al. . | |
| 4,392,246 | 7/1983 | Niioka et al. . | |
| 4,488,273 | 12/1984 | Nokihara et al. . | |
| 4,534,654 | 8/1985 | Maisel | 381/14 |
| 4,686,528 | 8/1987 | Ferrer et al. | 340/825.44 |
| 4,686,707 | 8/1987 | Iwasaki et al. . | |
| 4,787,085 | 11/1988 | Suto et al. | 455/6 |
| 4,805,217 | 2/1989 | Morihiro et al. . | |
| 4,829,500 | 5/1989 | Saunders | 381/77 |
| 4,829,558 | 5/1989 | Welsh . | |
| 4,879,751 | 11/1989 | Franks et al. | 381/81 |
| 4,887,308 | 12/1989 | Dutton | 455/158 |
| 4,908,713 | 3/1990 | Levine | 455/181 |

FOREIGN PATENT DOCUMENTS

| | | | |
|---|---|---|---|
| 58-131865 | 8/1983 | Japan | 455/181 |
| 60-170332 | 9/1985 | Japan . | |

OTHER PUBLICATIONS

E. B. U., Specifications of the radio dàta system RDS for VHF/FM sound broadcasting, Mar. 1984.

G. L. Dexter, a new age for radio, Popular Electronics, Oct. 1989.

*Primary Examiner*—Reinhard J. Eisenzopf
*Assistant Examiner*—Lisa Charouel
*Attorney, Agent, or Firm*—Leo Zucker

[57] ABSTRACT

A technique for broadcasting program material together with encoded items of information pertaining to the program material such as the title of a broadcast musical piece, the artist name, catalog number, and the like. A number of sources of recorded program material are provided at a broadcast site, and encoded information data pertaining to the program material is processed for transmission from the site with the broadcast program material. A receiver reproduces the program material and, upon entry of a memory command, decodes and stores the transmitted items of information data in a memory. Sets of stored information data relating to selected broadcasts can later be retrieved from the memory and output by a display and/or a printer device.

30 Claims, 3 Drawing Sheets

BROADCASTING SYSTEM WITH SUPPLEMENTAL DATA TRANSMISSION AND STORAGE

CROSS REFERENCE TO RELATED APPLICATION

This application is a continuation of my co-pending application Ser. No. 413,536 filed Sept. 27, 1989, now abandoned.

BACKGROUND OF THE INVENTION

I. Field of the Invention

The present invention relates generally to broadcasting systems, and more particularly to a system in which supplemental data is inserted in a broadcast carrier for transmission to specially adapted receivers capable of decoding the data.

II. Discussion of the Known Art

Listeners of all kinds of music frequently wish they can remember the name, artist or other pertinent information relating to a musical piece or selection they heard during a recent broadcast. If the listener happens to hear an announcer identify the piece before or after it is played over the broadcast station, he or she may note the information down with pencil and paper if convenient. Usually, however, the selection is first heard by the listener while driving or under some other condition where it is not possible or practical to jot down identifying information so as to enable the selection to be later purchased at a record/tape store.

Broadcast stations often transmit a number of musical pieces, one right after the other, by various artists and selected from different records or tapes, without any narration or other means of identifying the title of each piece just before or after it is played. Thus, when the announcer identifies each of, e.g., five selections that were played successively over the past 15 minutes, the listener cannot be sure which title and name identifies a particular selection he or she may have especially liked.

As far as is known, no existing or proposed commercial broadcasting system affords the listener an opportunity to identify, by means of supplemental information encoded in the broadcast carrier signal, items such as the artist and title of a musical selection simultaneously with its broadcast. A frequency-modulation (FM) broadcasting system has been proposed in which auxiliary tuning and program information is inserted into a monophonic or stereophonic FM broadcast in the commercial FM band of 88 to 108 MHz. See Specifications of the Radio Data System RDS for VHF/FM Sound Broadcasting, European Broadcasting Union, Tech. 3244-E (March 1984), referred to hereafter as "the EBU system".

In the EBU system, blocks of character data are continuously inserted, in synchronized fashion, in a 57 KHz sub-carrier of a FM broadcast signal. The blocks of data may correspond to (1) the country from which the broadcast originates, (2) the area of coverage, viz., international, national or regional, and (3) the type of program such as traffic information, sports, pop music or the like. Circuitry within specially designed automobile receivers would, upon decoding the data blocks, cause the receiver either to stay tuned to the received station, or to scan for another station that is transmitting a certain kind of program information pre-selected by the driver. The EBU system does contemplate transmissions of text material (Radiotext) addressed primarily to new home receivers. It is acknowledged that a changing message display on an automobile receiver could divert the driver's attention from the road and thus present a safety hazard.

U.S. Pat. No. 4,805,217 issued Feb. 14, 1989, discloses a receiving set with a playback function. A portion of an audio signal that is reproduced by a receiver can be stored in a digital memory, for later recall by the listener. Likewise, U.S. Pat. No. 4,268,724 issued May 19, 1981, and U.S. Pat. No. 4,488,273 issued Dec. 11, 1984, disclose systems in which a received radio broadcast program is first recorded on a continuous loop of magnetic tape prior to being audibly reproduced.

SUMMARY OF THE INVENTION

An object of the invention is to provide a broadcasting technique that allows listeners safely to record selected auxiliary information transmitted during a broadcast.

Another object of the invention is to provide a broadcasting technique wherein supplemental information pertaining to broadcast program material is inserted for transmission with the program material for decoding and storage in a broadcast receiver.

A further object of the invention is to provide a broadcasting technique in which items of identifying information are encoded for transmission with program material from a broadcasting station, and wherein the information items are decoded and stored in a receiver for later recall by a listener.

According to the invention, a method of broadcasting whereby supplemental information is encoded for transmission with program material, includes reproducing at a broadcast site a source of program material, processing the reproduced broadcast material for transmission over a broadcast carrier signal, inserting encoded items of information into the carrier signal, receiving with a specially adapted broadcast receiver the transmitted program material and the inserted information items, and enabling the received information items to be recalled and decoded by means in the specially adapted receiver after reception of the program material.

According to another aspect of the invention, a method of broadcasting program material together with items of information that identify the program material, includes providing at a broadcast site a number of sources of recorded program material, encoding in a given source items of identification data that identify the program material recorded in the source, reproducing the recorded program material and the items of identification data from the given source, transmitting the reproduced program material on a broadcast carrier signal, and processing the reproduced items of identification data for insertion into the carrier signal.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there are illustrated and described preferred embodiments of the invention.

DETAILED DESCRIPTION OF THE INVENTION

Figure 1:
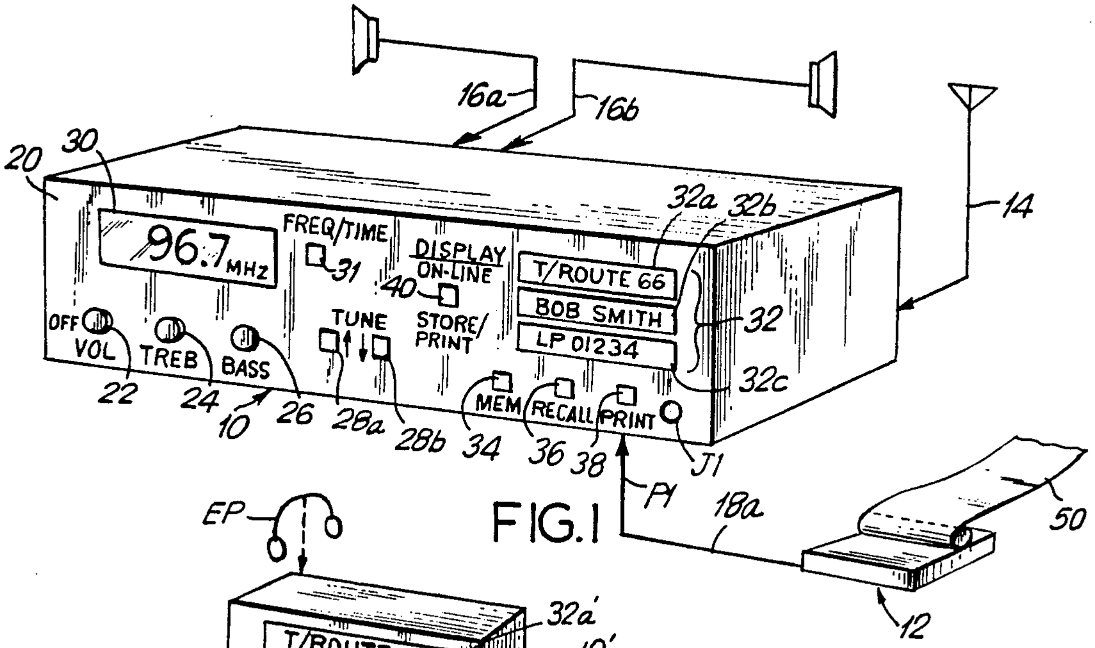
FIG. 1 is a perspective view of the overall appearance of a receiver and printer arrangement according to the present invention.

FIG. 1 is a perspective view of a receiver 10 and an associated printer device 12 arranged according to the invention. Receiver 10 may, for example, be dimensioned to fit in the dashboard of an automobile, and includes connectors on its back panel (not shown) for mating with an antenna cable 14 and a pair of speaker cables 16*a*, 16*b*. A connector J1 for printer cable 18*a* is also provided at a convenient location on the face of the receiver 10. If the receiver 10 is removable, it may desirable to locate the printer cable connector J1 on the rear apron of the receiver chassis, together with the connectors for the antenna cable 14 and speaker cables 16*a*, 16*b*.

Receiver 10 has a front panel 20 on which an on/off volume control 22, treble control 24, and bass control 26 are arranged. In the illustrated embodiment, the receiver 10 is an FM broadcast receiver, and broadcast stations are tuned in by scanning either upwardly or downwardly in frequency by way of corresponding scan buttons 28*a*, 28*b*. Either the tuned-in station frequency, or the current time, is displayed via a liquid crystal (LC) display panel 30. Selection of the display of either the tuned-in station frequency or the current time, is made via FREQ/TIME button 31.

Another LC display panel 32 is provided on the receiver front panel 20, and allows for display of up to 3 lines of alphanumeric text. Each line may allow for display of up to, for example, 16 characters. As shown in FIG. 1, the top or first line 32*a* of the display panel 32 displays a title, e.g., "Route 66" identifying a broadcast musical piece. The center or second line 32*b* of the panel 32 displays the artist's name, and the bottom or third line 32*c* of the LC display panel 32 is adapted to display a corresponding record or tape catalogue number to facilitate the purchase of the musical piece by a listener.

A memory button 34 is arranged in the vicinity of the LC display panel 32, and, when depressed, serves to store the various information items displayed by the lines 32*a*, 32*b* and 32*c* in a receiver memory, as explained in detail below with respect to FIG. 6. A recall button 36, also near the display panel 32, enables the recall of previously stored information items, for display and printing. A print button 38 causes the printing of the recalled information items via the printer device 12 as shown, for example, in FIGS. 3 and 4.

Also, a display select button 40 is arranged next to the panel 32 to allow for either on-line display of decoded information items, or display of successive sets of information items as recalled when operating the button 36.

Figure 2:
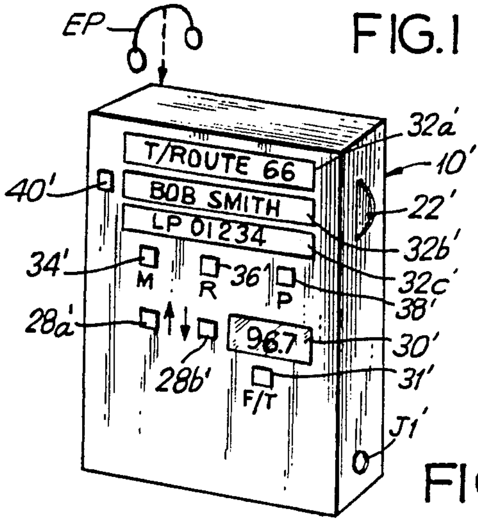
FIG. 2 is a perspective view of the overall appearance of a second embodiment of the receiver in FIG. 1.

FIG. 2 is a view of a second embodiment of the receiver 10 in FIG. 1. Corresponding components have similar reference characters. Instead of being in the form of an automobile radio, receiver 10' is adapted to be a portable unit and is powered, for example, either by a conventional self-contained battery or via an AC wall adapter (neither of which appears in the drawing). A receiver according to the present invention can also be in the form of a home table top or a cabinet mounted unit, and respond to broadcasts in the commercial AM and short-wave bands as well. Further discussion of the receiver 10' in FIG. 2 follows later below.

Figure 3:
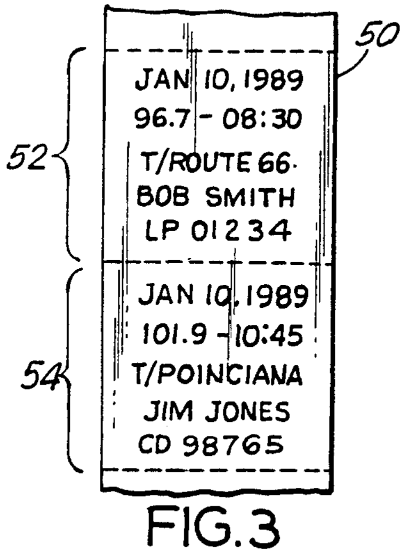
FIG. 3 is a view of two frames of printed identification text as may be obtained with the printer in FIG. 1.

FIG. 3 is a view of a portion of a paper strip 50 on which characters have been printed by the printer device 12. In addition to the three lines of identification information displayed by the LC display panel 32, a date, a station frequency and a time of day appear at the uppermost two lines of successive frames 52, 54 printed on the portion of the paper strip 50 shown in FIG. 3.

Specifically, print frame 52 indicates that on Jan. 10, 1989, while listening to an FM station broadcasting at a frequency of 96.7 MHz, the listener activated memory button 34 on the receiver 10 while listening to a musical piece entitled "Route 66", performed by "Bob Smith", and having a record catalogue number "LP 01234". Further, as shown at the end of the second line from the top of frame 52, memory button 34 was operated at 8:30 AM, i.e., the time of day during which the musical piece was actually being broadcast.

Frame 54 on the paper strip 50 indicates that on the same day, i.e., Jan. 10, 1989, but at 10:45 AM, the listener activated the memory button 34 while tuned to an FM station transmitting at 101.9 MHz and broadcasting a piece entitled "Poinciana" as performed by "Jim Jones", and having a compact disc (CD) catalogue number "CD 98765".

The two print frames 52, 54 which appear successively on the portion of the paper strip 50 shown in FIG. 3, are obtained as follows. Display button 40 is operated to set the receiver 10 in a store/print mode. Recall button 36 is then operated and, for example, the most recent set of identification data that was stored by operation of the memory button 34 is displayed on the LC display panel 32. Next, printer device 12 is connected to the receiver 10, and print button 38 is operated. Sets of stored identification data are then printed successively in the form of the frames 52, 54, and so on, on the paper strip 50 by the printer device 12. As mentioned, date, time and station frequency information are included in the frames 52, 54, so that the listener can correctly associate the printed data with the piece that was being broadcast when the memory button 34 was operated.

As shown in FIGS. 1 and 3, at the beginning of the line identifying the title of a musical piece, a prefix symbol or flag "T/" appears. The symbol, which stands for "Title" identifies the information on the line and the following lines, as information pertaining to the title of a piece which was broadcast when the memory button 34 was activated.

The present invention contemplates that in addition to providing information regarding the identification of a broadcast musical piece, a broadcasting station can transmit character text for purposes of advertising, for example, during periods when no musical program material is broadcast.

Figure 4:
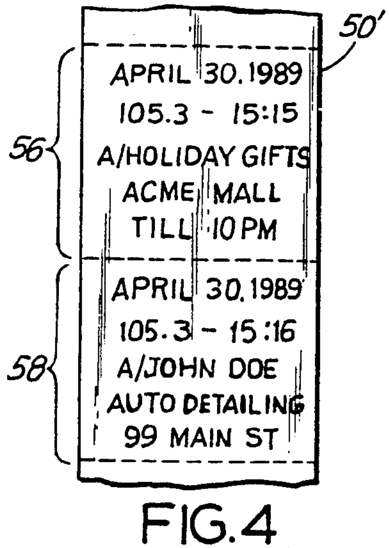
FIG. 4 is a view of two frames of advertising text as may be obtained from the printer in FIG. 1.

FIG. 4 shows a portion of a paper strip 50' on which such advertising text is printed by the printer device 12 when the receiver 10 has been set in the print mode by the recall button 36 and operation of the print button 38.

During those periods when no pre-recorded program material is being broadcast by a station, and the station announcer may be reading an advertisement, related advertising text is encoded in the broadcast carrier signal and transmitted to the receiver 10. With the display button 40 set in the on-line mode, three lines of the advertising text are displayed simultaneously with reception of the broadcast signal, by the LC display panel 32. The advertising text, as shown by the last three lines in the print frames 56, 58 in FIG. 3, provides essential information in regard to a typical advertisement, e.g., the advertiser name, business and location. At the beginning of the first line of the advertising text, a prefix symbol or flag "A/" is provided to designate the information on the line and the following lines of each frame as advertising material.

If the listener hears an advertisement of interest announced over a broadcast station, and would like to record essential information relating to the advertisement, he or she need only depress the memory button 34 while the receiver 10 is in the on-line mode. When the receiver 10 is later set in the print mode by recall button 36, the printer device 12 connected and print button 38 operated, sets of advertising text stored by the receiver are printed on the paper strip 50' together with the date, time and frequency of the originating broadcast station.

The above so-called advertising text may also include various sorts of messages originating directly from the announcer during intervals between music broadcasts, e.g., "Radio Ronald says don't forget Valentine's Day".

Figure 5:
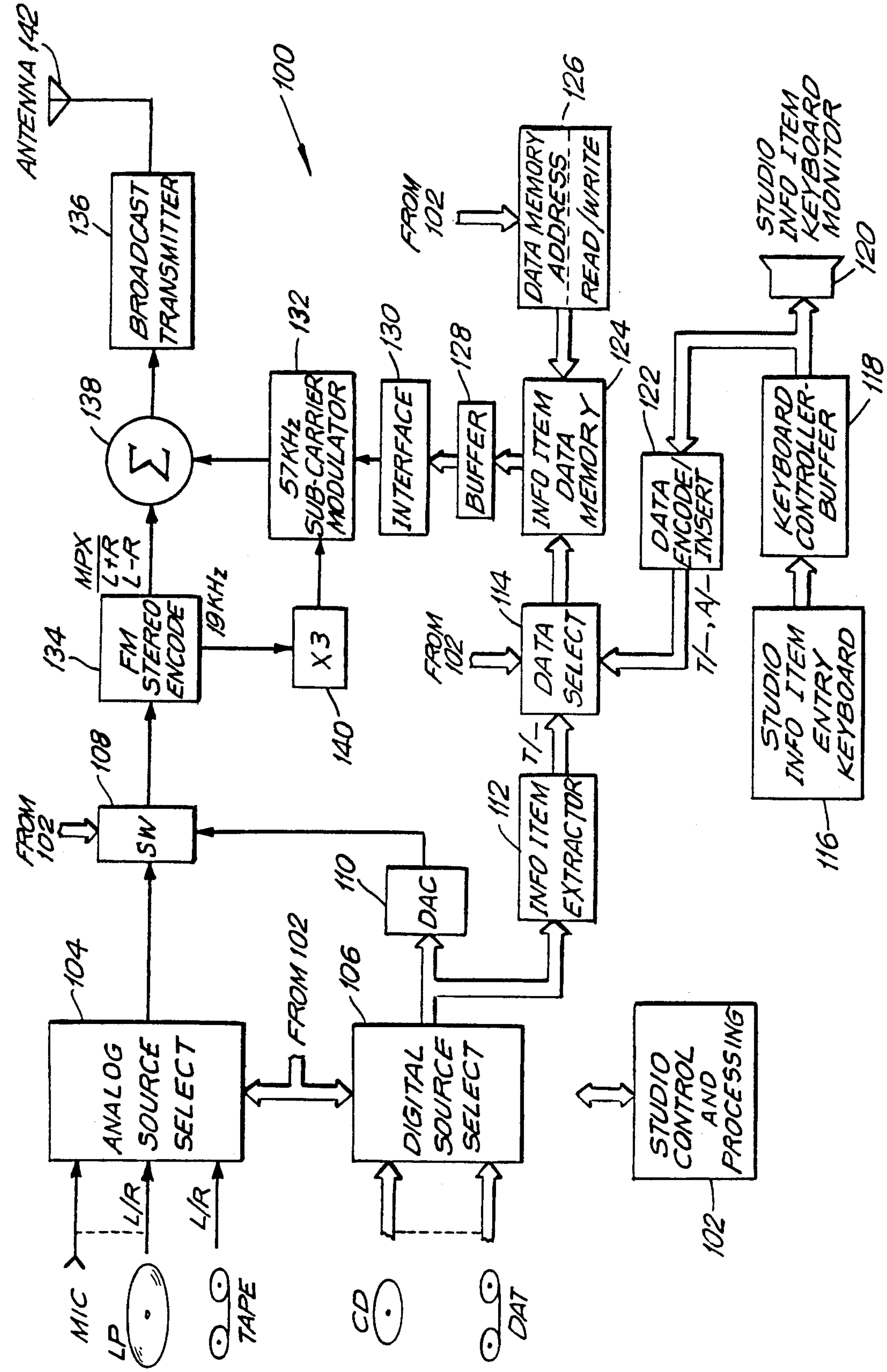
FIG. 5 is a schematic block diagram of the configuration of a broadcasting station according to the invention.

FIG. 5 is a schematic block diagram of an FM radio broadcast station 100 equipped to transmit encoded information text together with the broadcast carrier signal, according the invention.

A studio control and processing unit 102 is provided to control operations of various components comprising the broadcast station 100. The control and processing unit 102 includes one or more central processing units (CPUs), program and working memories and input-/output devices, as are ordinarily required in accordance standard engineering practice.

Since program source material may be in the form of analog media such as long playing records (LPs) or tapes; or digital media such as CDs or digital audio tapes (DATs), an analog source select switching unit 104 and a separate digital source select switching unit 106 are provided. Depending on the particular program source material, one of the source select switching units 104, 106 is enabled via control and processing unit 102. During periods when the studio microphone is "live", an announcer or other persons' voices are picked-up by one or more microphones (MICs) coupled to the analog source select switching unit 104, the output of which is coupled to one input of analog switch 108. Digital source select switching unit 106 has an output bus coupled to an input of a digital-to-analog converter circuit (DAC) 110 the analog output of which is coupled to another input of the analog switch 108. At least part of the output bus from the digital source select unit 106 is coupled to an input of an information item extractor circuit 112 the purpose of which is as follows.

The auxiliary or identifying information text to be encoded for transmission with a broadcast carrier signal by the station 100, preferably has a digital format. It is therefore contemplated that various sources of musical program material such as CDs and DATs will provide, in addition to pre-recorded musical program material, identification information or data in digital form which data corresponds to that described in connection with FIGS. 1 and 3 for purposes of identifying the title, artist and catalogue number pertaining to the prerecorded material. Such identification text, hereafter referred to as "information items" is capable of being detected separately during play of the encoded digital source material by the information item extractor circuit 112 which provides the extracted data to one input of a data select switch 114. The "T/" prefix which appears in the display and print formats shown and described in connection with FIGS. 1 and 3, may be encoded in the digital program source material together with the information item data, or can be appended to that data when output from the extractor circuit 112.

Since the currently available program source material, whether analog or digital, will not have encoded information item data, data corresponding to that represented in FIGS. 1–4 is inserted at the broadcast station 100 via a studio information item entry keyboard 116. The keyboard 116 is controlled and its output is buffered by keyboard controller-buffer circuitry 118. Keyboard entries made by the studio announcer or other personnel are monitored via an information item keyboard monitor 120. Information item data entered by the keyboard 116 is supplied through the buffer circuitry 118 to a data encode/insert stage 122. Accordingly, character data entered via the keyboard is, prior to insertion in a broadcast carrier signal produced by the station 100, encoded to conform with a determined standard format adopted for the information items as transmitted with the carrier signal. An output of the data encode/insert stage 122 is coupled to another input of the data select switch 114.

Information item data to be transmitted, whether originating from a digital program material source or by manual entry from the keyboard 116, is output from the data select switch 114 through a suitable interface (not shown) into an information item data memory 124. Addressing of the data memory 124, and read or write control of the memory 124 is performed by a data memory controller 126 which in turn is subject to the control of studio control and processing unit 102. The output of the data memory 124 is supplied through a buffer stage 128 to digital-to-analog convertor or interface 130 an output of which is supplied through appropriate buffer circuitry (not shown) to a sub-carrier modulator 132.

The sub-carrier modulator 132 may, for example, amplitude-modulate a 57 KHz sub-carrier transmitted by the station 100 with the broadcast carrier signal while stereophonic program material is frequency-modulated on the carrier in accordance with established broadcast standards. In the United States, FM broadcast radio standards are set out by the Federal Communications Commission (FCC) at 47 C.F.R. secs. 73.201 to 73.333. All pertinent portions of the cited broadcast standards are incorporated by reference herein.

Specifically, 47 C.F.R. 73.319 permits the use during either monophonic or stereophonic program broadcasting, of a sub-carrier that may be modulated in any form to transmit information supplemental to the regular broadcast signals. For stereophonic sound program transmissions which require insertion of a stereophonic sub-carrier at 38 KHz, the frequency of the multiplex sub-carrier must lie within the range of 53 KHz to 99 KHz. 47 C.F.R. 73.319 & 73.323. In the illustrated embodiment of the broadcast station 100 in FIG. 5, a 57

KHz multiplex sub-carrier is employed, this frequency being the third harmonic of a 19 KHz pilot sub-carrier which is required to be inserted on FM stereophonic sound transmissions.

Reproduced program source material, or live studio microphone audio, as output from the analog switch 108 is applied to the input of an FM stereo encode circuit 134. Left (L) and right (R) sum and difference signals are output from the stereo encode circuit 134 to be supplied as input signals to an FM broadcast transmitter 136 through a combining network 138. The 19 KHz pilot sub-carrier signal is produced within the stereo encode circuit 134 and a sample of the 19 KHz signal is supplied to a frequency tripler 140 to generate a coherent 57 KHz sub-carrier signal which, in turn, is applied to an input of the sub-carrier modulator 132. The 57 KHz sub-carrier signal is, for example, double side-band (DSB) modulated by the information item data present at the output of the interface circuit 130. The modulated 57 KHz sub-carrier is supplied to another input of the combining network 138 to be combined with the broadcast carrier signal generated by the broadcast transmitter 136 and radiated from an antenna installation 142.

Figure 6:
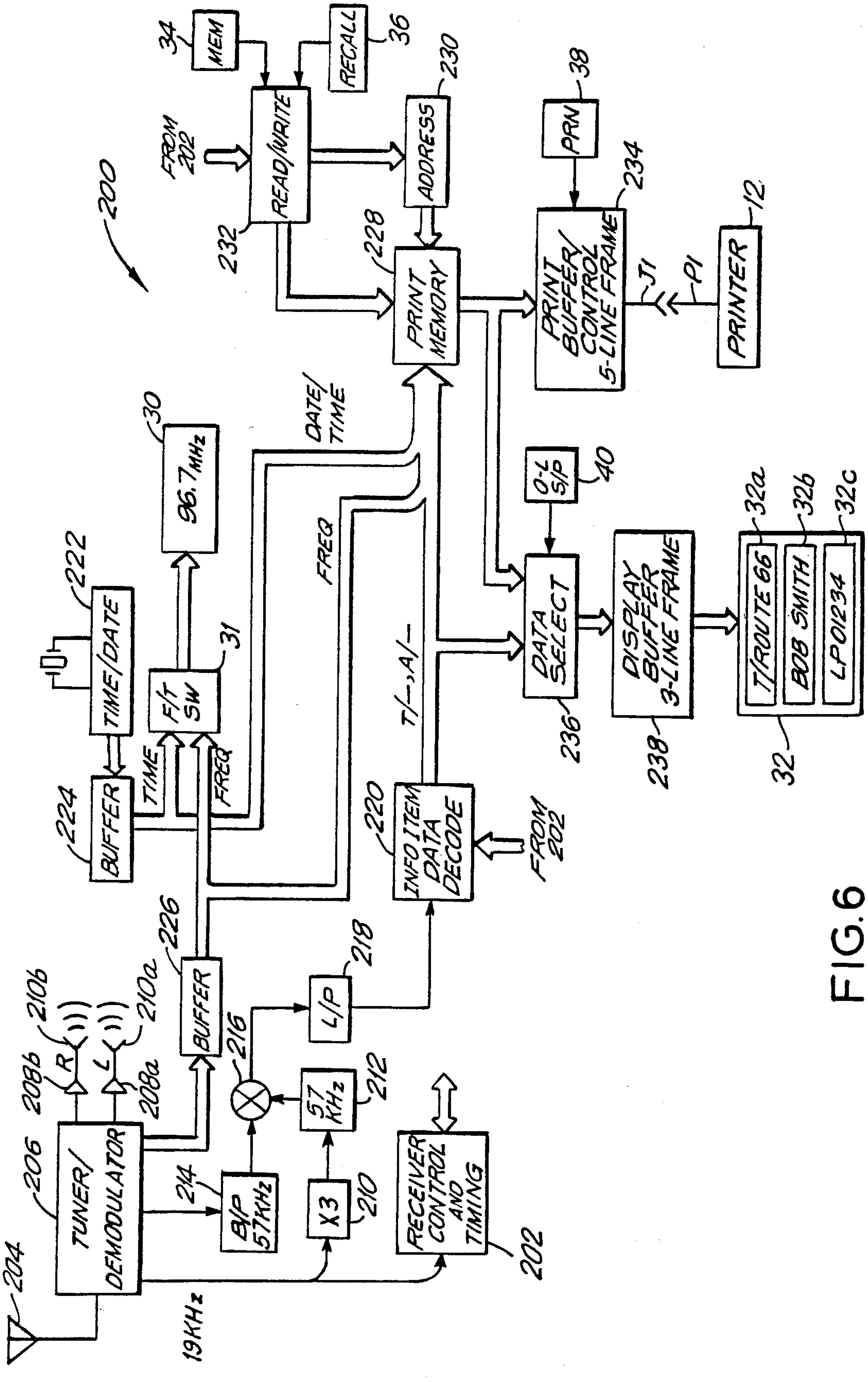
FIG. 6 is a schematic block diagram of the configuration of the receiver in FIG. 1 or 2.

FIG. 6 is a schematic block diagram of the electronic circuit configuration 200 in the receiver 10. A receiver control and timing circuit 202 includes one or more CPUs, program and working memories and input/output devices, as are ordinarily required in accordance with standard engineering practice. Circuit 202 controls the operations of various components that comprise the receiver circuit configuration 200.

Signals detected by a receiving antenna 204 are input to a tuner/demodulator unit 206 which can take the form of a conventional FM stereo tuner. Demodulated L and R audio signals are supplied to a pair of amplifiers **208*a*, 208*b* for sound reproduction by corresponding speakers 210*a*, 219*b*. A sample of the 19 KHz pilot signal as demodulated by the unit 206, is supplied to control and timing circuit 202 for purposes of synchronization. The 19 KHz pilot signal is also input to a tripler circuit 210 from which a 57 KHz signal is derived by generator 212 in synchronism with the 57 KHz multiplex sub-carrier inserted into the broadcast carrier signal at the station 100. The broadcast DSB modulated 57 KHz sub-carrier is detected and output from the demodulator unit 206 through a bandpass filter 214 to an input of a balanced demodulator circuit 216. The output of demodulator 216 passes through low-pass filter 218 to the input of an information item data decode stage 220. The decode stage 220 converts the DSB modulated information item data into a form suitable for processing, display and printing (e.g., an ASCII format) by the data handling stages of the receiver 10 (or 10'). That is, the data decode stage 220 performs a conversion operation that is inverse to the one performed by the data encode/insert stage 122 at the broadcast station 100**.

The output of the data decode stage 220 is suitably buffered by conventional means, and corresponds to the last three lines of the print frames 52, 54, or 56, 58 shown in FIGS. 3 and 4. That is, information data that identifies or pertains to currently broadcast program material, which information may be prefaced by the "T/" or "A/" flag, is output from the data decode stage 220 under the control of receiver control and timing circuit 202.

Receiver 10 (or 10') has an internal calender circuit 222 which may be, for example, quartz crystal controlled to supply data corresponding to the present date and time in 24-hour format. Output date and time data is buffered at 224 and routed to one input of frequency-time switch circuit 31. Frequency data corresponding to an FM broadcast frequency to which the tuner/-demodulator 206 is presently set, is buffered at 226 and supplied to the other input of the frequency-time switch circuit 31. Depending on the setting of the switch 31, the LC display panel 30 on the front of the receiver will display either the current time (and date), or the main carrier frequency of a received broadcast station as illustrated in FIG. 6.

The date and time data from the buffer 224, and the frequency data from the buffer 226 are also supplied to an input bus of a print memory 228. Information item data as decoded and output from the decode stage 220 is also supplied to the input bus of the print memory 228, so that data corresponding to the current date, time and station frequency are continuously appended to the decoded information item data obtained from the tuner/demodulator unit 206 of the receiver 10, whenever the information item data is written at selected addresses of the print memory 228.

Address selector circuit 230 is coupled to the print memory 228 and selects sets of, e.g., five memory addresses for storage of each set of information item data. Read/write circuit 232 coupled to the address circuit 230 and the print memory 228 sets the print memory in either a store/write mode in response to operation of memory button 34, or a read/print mode in response to operation of the recall button 36. The output of print memory 228 is supplied to a print buffer/control circuit 234 which is responsive to operation of the print button 38 on the front of the receiver. The buffer/control circuit 234 is adapted to supply, for example, successive five-line frames of text to the printer device 12 through a suitable connector arrangement J1, P1 when the print button 38 is operated. The output of print memory 228 is also routed to one input of display data select circuit 236. The 3-line, decoded information item data from the decode stage 220 is supplied to the other input of data select circuit 236, so as to enable either on-line information item data from the decode stage 220, or previously stored information item data from the output of the print memory 228, to be selected in response to operation of button 40 on the front of the receiver. A display buffer stage 238 arranges the information item data output from the select circuit 236 in suitable form for the three-line text display provided by the receiver LC display panel 32.

Operation of the present broadcasting system proceeds as follows.

A source of musical program material is selected at the radio broadcast station 100 by the announcer or other person in charge. If the program source material has not been previously encoded with information item data as defined herein, such data is entered at the studio by way of the keyboard 116 and supplied to the data encode/insert stage 122 in FIG. 5. Data select switch 114 is set to receive the encoded information item data, with the "T/" prefix in the case of musical program material (or the "A/" prefix in the case of an advertising message) and the encoded data is written into the data memory 124 under the control of the data memory controller 126. At or soon after the selected program material is selected and encoded for stereo transmission at 134, the information item data stored in the data memory 124 is read out through the buffer stage 128 and the interface circuit 130 to modulate the 57 KHz sub-carrier inserted in the broadcast carrier signal by the transmitter 136. In the event the information item data is pre-recorded with the program source material on a digital recording medium such as a CD or a DAT, the data is extracted at 112 and routed by the data select switch 114 to be written in the information item data memory 124 at the appropriate time during reproduction of the program material. A listener receiving the broadcast program from the station 100 with the receiver 10 (or 10'), upon hearing a musical piece or an advertisement of particular interest, operates the memory button 34 so as to enable information item data modulated on the 57 KHz multiplex sub-carrier at the time to be decoded at 220 and stored with the current date, time and station frequency at predetermined addresses of the print memory 228. If the display panel 32 on the receiver is set to the on-line mode by the button 40, the listener will be able to view the text of the information item data that he or she is concurrently storing.

When the listener wishes to obtain a printed list of sets of information item data as stored during a previous time interval, he or she operates the recall button 36 which enables the read/write circuit 232 to cause, for example, the most recently stored set of information item data in the print memory 228 to be read out to the print buffer/control circuit 234 and the display data select circuit 236. Button 40 is then operated to allow the read-out data to be selected by the circuit 236 for display on the panel 32 of the receiver and, moreover, a printed record may be obtained including the date, time and station frequency, by operating print button 38 to enable the buffer/control circuit 234 to output a 5-line frame of text to the printer device 12.

Alternatively, read/write circuit 232 may be controlled to cause the oldest stored set of information item data to be read out first from the print memory 228, proceeding to the most recently stored set of data upon successive operations of the recall button 36.

Because of its information storage capability, the receiver in the present broadcasting system does not pose a safety hazard if installed in a vehicle. The driver, in order to note pertinent text transmitted simultaneously with a broadcast program, need only press the memory button 34. A permanent record of the text then can be retrieved and read after the vehicle is safely parked.

Although the embodiments disclosed herein relate to an FM radio broadcasting system, it will be understood that other applications of the present invention are also possible, e.g., in television broadcasting.

Further, the receiver 10' of FIG. 2 may be of the kind having its sound output coupled to earphones EP adapted to be worn by a person while relaxing, walking, jogging or the like.

Receiver 10' can also act as a "monitor" to be used in conjunction with existing home or automobile radios which lack the information data decoding and storage stages shown in FIG. 6. That is, in order for a listener to realize the full benefit of the present broadcasting system, he or she need only keep the monitor receiver 10' of FIG. 2 on hand. When hearing a musical piece or advertisement of interest being broadcast, the receiver 10' is then turned on and tuned to the broadcasting station frequency. The listener then can store any information data transmitted at the time in his or her own monitor receiver, and recall the data later on as desired.

While the foregoing description represents a preferred embodiment of the present invention, it will be obvious to those skilled in the art that various changes and modifications may be made, without departing from the spirit and scope of the present invention as pointed out by the following claims.

What is claimed is:

1. A method of broadcasting whereby supplemental information is encoded for transmission together with program material, comprising the steps of:

reproducing at a broadcast site a source of program material;

processing the reproduced program material for transmission over a broadcast carrier signal;

inserting encoded items of information associated with the program material into the carrier signal upon transmission of the program material;

receiving the transmitted carrier signal and reproducing the program material at a receiver;

decoding, at said receiver, the information items inserted into the carrier signal in association with the program material;

providing said receiver with display means for displaying the decoded items of information;

providing said receiver with memory means;

selecting desired decoded items of information associated with the program material for storage in the memory means by entering a memory command to the receiver;

storing the desired decoded items of information in the memory means;

selecting one of a first and a second display mode for the display means by actuating a manual selecting means;

displaying on said display means information items as decoded from the carrier signal in said decoding step, when the first display mode is selected; and displaying on said display means the decoded items of information that are stored in said memory means after entering a recall command to the receiver, when the second display mode is selected.

2. A method according to claim 1, including locally generating at the receiver information data for supplementing the decoded information items, appending the locally generated information data to the decoded information items, and storing the decoded information items with the appended information data in the memory means in response to said memory command.

3. A method according to claim 1, including printing the information items stored in said memory means upon entering a print command to the receiver.

4. A method according to claim 1, including frequency-modulating the reproduced program material on the broadcast carrier signal at the broadcast site.

5. A method according to claim 1, including inserting the encoded items of information into the carrier signal as digital data.

6. A method according to claim 5, including amplitude-modulating said digital data on a sub-carrier inserted into the broadcast carrier signal.

7. A method of broadcasting whereby supplemental information is encoded for transmission together with program material, comprising the steps of:

reproducing at a broadcast site a source of program material;

processing the reproduced program material for transmission over a broadcast carrier signal;

inserting encoded items of information associated with the program material into the carrier signal upon transmission of the program material;

receiving the transmitted carrier signal and reproducing the program material at a receiver;

decoding, at said receiver, the information items inserted into the carrier signal in association with the program material;

locally generating at the receiver information data for supplementing the decoded information items;

appending the locally generated information data to the decoded information items;

providing said receiver with memory means;

selecting desired decoded items of information associated with the program material for storage in the memory means by entering a memory command to the receiver;

storing the desired decoded items of information with the appended information data in the memory means;

coupling printing means to said receiver; and printing the stored desired decoded items of information with the appended information data via said printing means upon entering a print command to the receiver.

8. A method according to claim 7, including frequency-modulating the reproduced program material on the broadcast carrier signal at the broadcast site.

9. A method according to claim 8, including amplitude-modulating the encoded items of information on a sub-carrier inserted into the broadcast carrier signal.

10. The method of claim 7, wherein said locally generating step includes generating at the receiver frequency data corresponding to a station frequency to which the receiver is tuned, and including the frequency data with the information data printed via said printing means upon entering said print command.

11. The method of claim 7, wherein said locally generating step includes generating at the receiver time data corresponding to a current time of day, and including the time data with the information data printed via said printing means upon entering said print command.

12. The method of claim 7, wherein said locally generating step includes generating at the receiver date data corresponding to a current date, and including the date data with the information data printed via said printing means upon entering said print command.

13. The method of claim 7, including printing the stored desired decoded items of information with the appended information data as successive frames each having a determined number of print lines on a paper strip loaded in said printing means.

14. A broadcasting system for enabling a listener to obtain certain information associated with transmitted program material, comprising:

a broadcast station including, source means for supplying program material;

means for transmitting the program material over a broadcast carrier signal;

means for generating information item data for association with the program material; and means for encoding the information item data on said broadcast carrier signal upon transmission of the program material; and a receiver including, tuner/demodulator means for detecting the program material transmitted over the broadcast carrier signal, and the information item data encoded on said signal;

means for reproducing the detected program material;

decoding means coupled to said tuner/demodulator means for decoding the information item data encoded on the broadcast carrier signal;

display means for displaying the decoded information item data;

memory means for storing desired decoded information item data associated with the program material in response to a memory command signal; and display data select means coupled to said decoding means and to said memory means for selecting one of a first and a second display mode for the display means, wherein said display data select means includes means for displaying on said display means information item data as decoded from the broadcast carrier signal by said decoding means, when the first display mode is selected by said display data select means, and means for displaying on said display means the decoded information item data stored in said memory means in response to a recall command signal, when the second display mode is selected by said display data select means.

15. A broadcasting system according to claim 14, including address control means coupled to said memory means for controlling read and write operations for addresses of the memory means, and memory button means coupled to the address control means for producing said memory command signal and causing decoded information item data to be written at certain addresses of the memory means each time said memory button

16. A broadcasting system according to claim 15, including recall button means coupled to said address control means for producing said recall command signal and causing information item data written at said certain addresses of the memory means to be read out in a determined order when said recall button means is operated.

17. A broadcasting system according to claim 16, wherein said display data select means includes means for causing the information item data to be displayed by said display means in said determined order when in said second display mode.

18. A broadcasting system according to claim 16, including print buffer/control means coupled to said memory means for enabling the information item data to be printed by a printer unit in said determined order.

19. A broadcasting system according to claim 14, wherein said generating means of said broadcast station includes means for generating identification flag data for defining a kind of information item data generated with respect to the associated program material, and said encoding means encodes said identification flag data along with the information item data on said broadcast carrier signal.

20. A broadcasting system according to claim 18, wherein said print buffer/control means includes means for enabling the read out information item data to be output to the printer unit in the form of successive frames each having a determined number of print lines.

21. A broadcasting system according to claim 20, wherein the print lines of the frames relate to identification of a title of the transmitted program material.

22. A broadcasting system according to claim 20, wherein the print lines of the frames relate to an advertisement.

23. Receiving apparatus for enabling a listener to obtain certain information associated with program material transmitted over a broadcast carrier signal to which the apparatus is tuned, comprising:

tuner/demodulator means for detecting program material transmitted over a broadcast carrier signal when the tuner/demodulator means is tuned to receive the broadcast carrier signal;

means for reproducing the detected program material;

decoding means associated with said tuner/demodulator means for decoding information item data encoded on the broadcast carrier signal, wherein said information item data is related to the transmitted program material;

display means for displaying the decoded information item data;

memory means for storing desired decoded information item data related to the program material in response to a memory command signal; and display data select means coupled to said decoding means and to said memory means for selecting one of a first and a second display mode for the display means, wherein said display data select means includes means for displaying on said display means information item data as decoded from the broadcast carrier signal by said decoding means, when the first display mode is selected by said display data select means, and means for displaying on said display means the decoded information item data stored in said memory means in response to a recall command signal, when the second display mode is selected by said display data select means.

24. Receiving apparatus according to claim 23, including address control means coupled to said memory means for controlling read and write operations for addresses of the memory means, and memory button means coupled to the address control means for producing said memory command signal and causing decoded information item data to be written at certain addresses of the memory means each time said memory button means is operated.

25. Receiving apparatus according to claim 23, including recall button means coupled to said address control means for producing said recall command signal and causing information item data written at said certain addresses of the memory means to be read out in a determined order when said recall button means is operated.

26. Receiving apparatus according to claim 25, wherein said display data select means includes means for causing the information item data to be displayed by said display means in said determined order when in said second display mode.

27. Receiving apparatus according to claim 25, including print buffer/control means coupled to said memory means for enabling the information item data to be printed by a printer unit in said determined order.

28. Receiving apparatus according to claim 27, wherein said print buffer/control means includes means for enabling the read out information item data to be output to the printer unit in the form of successive frame each having a determined number of print lines.

29. Receiving apparatus according to claim 28, wherein the print lines of the frames relate to identification of a title of the transmitted program material.

30. Receiving apparatus according to claim 28, wherein the print lines of the frames relate to an advertisement.

* * * * *